US012640470B2

(12) United States Patent

Kim et al.

(10) Patent No.: US 12,640,470 B2
(45) Date of Patent: May 26, 2026

(54) METHOD AND SYSTEM FOR MANAGING ORIENTATION DIRECTION OF MOBILE COMMUNICATION BASE STATION ANTENNA

(71) Applicant: KMW INC., Hwaseong-si (KR)

(72) Inventors: In Ho Kim, Yongin-si (KR); Hee Sub Kim, Hwaseong-si (KR); Min Seon Yun, Anyang-si (KR); Jae Woo Choi, Goyang-si (KR); Ju Hun Lee, Anyang-si (KR); Young Ji Hong, Hwaseong-si (KR); Mun Gyu Park, Gwangmyeong-si (KR); Gun Woo Kim, Seoul (KR)

(73) Assignee: KMW INC., Hwaseong-si (KR)

( * ) Notice: Subject to any disclaimer, the term of this patent is extended or adjusted under 35 U.S.C. 154(b) by 345 days.

(21) Appl. No.: 18/205,507

(22) Filed: Jun. 3, 2023

(65) Prior Publication Data

US 2023/0411842 A1 Dec. 21, 2023

Related U.S. Application Data

(63) Continuation of application No. PCT/KR2021/018276, filed on Dec. 3, 2021.

(30) Foreign Application Priority Data

Dec. 4, 2020 (KR) ........................ 10-2020-0168992
Dec. 3, 2021 (KR) ........................ 10-2021-0172002

(51) Int. Cl.
*H01Q 3/00* (2006.01)
*G06T 7/70* (2017.01)
(Continued)

(52) U.S. Cl.
CPC ............... *H01Q 3/08* (2013.01); *H01Q 1/428* (2013.01); *H01Q 3/34* (2013.01)

(58) Field of Classification Search
None
See application file for complete search history.

(56) References Cited

U.S. PATENT DOCUMENTS

2008/0012750 A1 1/2008 Austin et al.
2009/0141179 A1 * 6/2009 Jung ...................... H01Q 1/246 348/E5.093
(Continued)

FOREIGN PATENT DOCUMENTS

CN 102187597 A 9/2011
CN 102217358 A 10/2011
(Continued)

OTHER PUBLICATIONS

International Search Report mailed Mar. 8, 2022 for International Application No. PCT/KR2021/017545 and its English translation.
(Continued)

*Primary Examiner* — Mohammed Rachedine

(57) ABSTRACT

The present invention relates to remotely monitoring and controlling the direction of an antenna device measured in real time on the basis of three-dimensional spatial direction information of the antenna device. The three-dimensional spatial direction information of the antenna device measured in real time by a beam navigator makes it possible to align and manage the antenna device remotely by using a remote-controlled tilting and steering (RTS) means provided in the antenna device.

5 Claims, 8 Drawing Sheets

(51) Int. Cl.

| | |
|---|---|
| ***H01Q 1/24*** | (2006.01) |
| ***H01Q 1/42*** | (2006.01) |
| ***H01Q 3/02*** | (2006.01) |
| ***H01Q 3/08*** | (2006.01) |
| ***H01Q 3/34*** | (2006.01) |

(56) References Cited

U.S. PATENT DOCUMENTS

| | | | | |
|---|---|---|---|---|
| 2011/0151932 | A1* | 6/2011 | Kim | H04B 17/23<br>455/562.1 |
| 2021/0134005 | A1* | 5/2021 | Suzaki | G01S 3/7865 |
| 2022/0352942 | A1* | 11/2022 | Kalantari | B64C 39/024 |

FOREIGN PATENT DOCUMENTS

| | | | | | |
|---|---|---|---|---|---|
| CN | 202066499 | U | | 12/2011 | |
| CN | 109075442 | A | | 12/2018 | |
| JP | 2010216929 | A | * | 9/2010 | |
| JP | 2012-500548 | A | | 1/2012 | |
| JP | 2020-530104 | A | | 10/2020 | |
| KR | 10-0323593 | B1 | | 4/2002 | |
| KR | 10-2013-0092851 | A | | 8/2013 | |
| KR | 20130092851 | A | * | 8/2013 | H01Q 3/08 |
| KR | 10-2015-0060308 | A | | 6/2015 | |
| KR | 10-1685634 | B1 | | 12/2016 | |
| WO | 2009/097282 | A1 | | 8/2009 | |
| WO | WO-2021261618 | A1 | * | 12/2021 | H01Q 1/24 |
| WO | WO-2022036577 | A1 | * | 2/2022 | H04B 7/086 |

OTHER PUBLICATIONS

Non-final Office Action mailed Apr. 1, 2023 from the Korean Intellectual Property Office for Korean Application No. 10-2021-0172002 and its English translation.

Non-final Office Action mailed on Apr. 23, 2024 from the Japanese Patent Office for Japanese Application No. 2023-532681 and its English translation.

European Search Report dated Sep. 24, 2024 for Application No. 21901088.1.

Chinese Office Action dated Oct. 21, 2025 from The State Intellectual Property Office for Application No. 202180081534.X.

* cited by examiner

METHOD AND SYSTEM FOR MANAGING ORIENTATION DIRECTION OF MOBILE COMMUNICATION BASE STATION ANTENNA

CROSS-REFERENCE TO RELATED APPLICATION(S)

This application is a continuation application of International Application No. PCT/KR2021/018276, filed Dec. 3, 2021, which claims priority to Patent Application No. 10-2020-0168992, filed on Dec. 4, 2020 in Korea, and Patent Application No. 10-2021-0172002, filed on Dec. 3, 2021 in Korea, the entire contents of which are incorporated herein by reference.

TECHNICAL FIELD

The present disclosure relates to an antenna, and more particularly, to a method and system for managing the orientation direction of a mobile communication base station antenna capable of monitoring and adjusting information on the orientation direction of the antenna.

BACKGROUND ART

Contents described below merely provide background information related to embodiments of the present disclosure and do not constitute the related art.

A position and angle of an antenna installed in a mobile communication base station should be determined according to precise design. In general, the installation location of the antenna is determined according to the result of network design considering coverage and traffic. An orientation angle of the antenna is determined by considering a sector orientation angle of a horizontal component of a beam. A tilting angle of the antenna is determined by considering a tilting angle of a vertical component of the beam. The orientation angle and tilting angle are optimized to suit a radio environment of a site where the antenna is installed through testing.

Radio signals in a frequency band of 5G 3.5 GHz have strong radio wave straightness. Therefore, in order to secure a planned service coverage, the antenna should be installed with a pre-designed antenna azimuth. In the future, even when increasing antennas, design and optimization should be performed based on consistent indicators to secure service quality. In particular, since the radio wave straightness increases as the frequency band increases, a design that minimizes azimuth errors should be performed in antenna installation.

In response to changes in a wireless environment, there are cases in which a tilting angle and an orientation angle of a pre-installed antenna need to be readjusted. For example, a tilt of a mast supporting the antenna may change due to an external environment such as strong wind. Alternatively, a clamp for combining the antenna and the mast may be twisted in a horizontal direction. When the tilting angle or orientation angle of the antenna is different, there is a problem in that a worker should perform direction measurement and alignment work using an expensive measuring instrument of a Dual GPS method in the field.

Therefore, it is necessary to measure spatial orientation information of an antenna without putting a worker in a field of a mobile communication base station, and to adjust a tilting angle and an orientation angle of the antenna so that the antenna has a target spatial orientation.

DISCLOSURE

Technical Problem

According to one aspect of the present disclosure, a main object thereof is to provide an antenna management method and system for measuring the orientation direction of a mobile communication base station antenna in real time and controlling an antenna so that the antenna has a target orientation direction.

Technical Solution

According to an embodiment of the present disclosure, an antenna management system including a direction control device for controlling the orientation direction of a mobile communication base station antenna, wherein the direction control device comprises: a data receiving unit configured to receive spatial orientation information of an antenna device or video data obtained by capturing a foreground orientated by the antenna device from a measuring device; and a control unit configured to control a tilting and steering means of the antenna device so that the antenna device has a preset target spatial orientation using at least one of the spatial orientation information and the video data.

According to another embodiment of the present disclosure, an antenna management method performed by a direction control device for controlling an orientation direction of a mobile communication base station antenna on an antenna management system including the direction control device, the antenna management method comprising: receiving spatial orientation information of an antenna device or video data obtained by capturing a foreground orientated by the antenna device from a measuring device; and controlling a tilting and steering means of the antenna device so that the antenna device has a preset target spatial orientation using at least one of the spatial orientation information and the video data.

According to yet another embodiment of the present disclosure, an antenna management system including a measuring device for measuring an orientation direction of a mobile communication base station antenna, wherein the measuring device mounted on a housing of an antenna device comprises: a communication unit configured to transmit or receive data to or from a direction control device for controlling a tilting and steering means of the antenna device or the antenna device; a direction measuring unit configured to detect an incident angle of sunlight to measure spatial orientation information of the antenna device; and an image generating unit configured to generate video data obtained by capturing a foreground orientated by the antenna device.

Advantageous Effects

According to an embodiment of the present disclosure, since a spatial direction of an antenna is measured and controlled using a measuring device and a direction control device, it is possible to maintain base station facilities without putting workers into the field.

MODE FOR DISCLOSURE

The present disclosure relates to measuring 3D spatial orientation information of an antenna device in real time, and remotely monitoring and controlling a direction of the antenna device based on spatial orientation information. In order to measure the 3D spatial orientation information of the antenna device, the present disclosure uses a low-cost and low error rate measuring device compared to an expensive measuring instrument of a Dual GPS method. Since the measuring device of the present disclosure has a small size compared to the size of the antenna, there is an advantage in that it is easy to install on the antenna. Since the measuring device measures the 3D spatial orientation information of the antenna device, it may be referred to as a beam navigator (BN).

The detailed description set forth below in conjunction with the accompanying drawings is intended to describe exemplary embodiments of the present disclosure, and is not intended to represent the only embodiments in which the present disclosure may be practiced.

Figure 1:
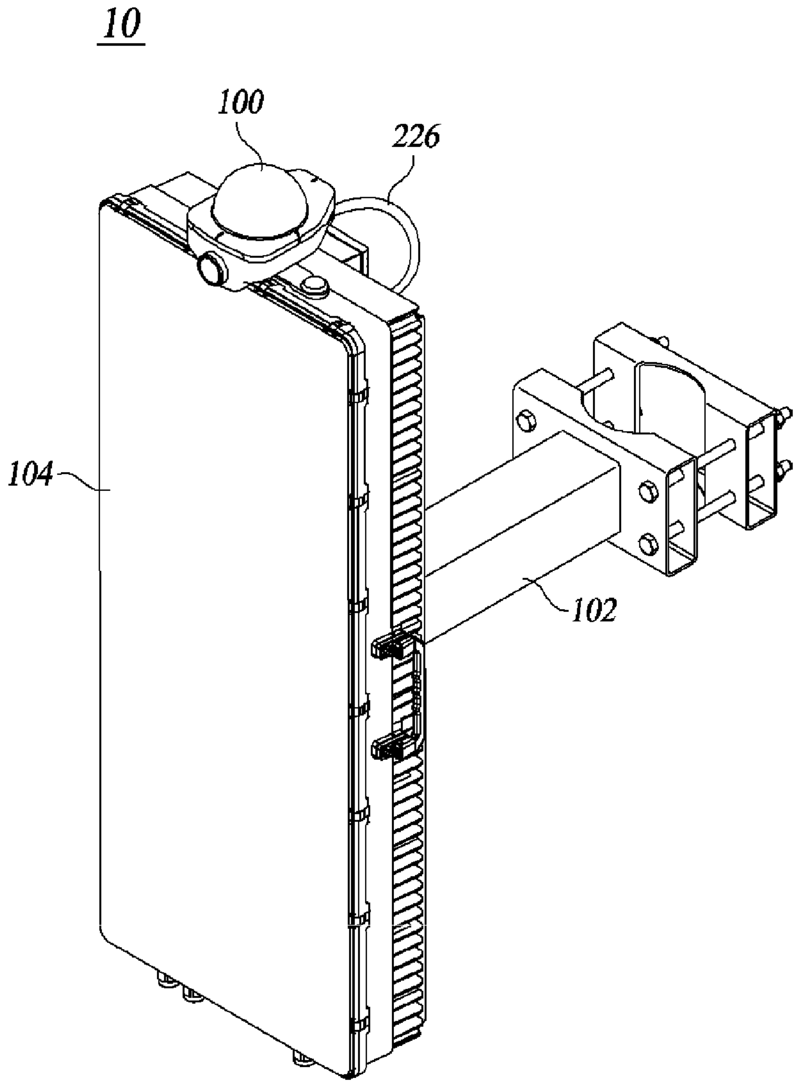
FIG. 1 is a conceptual diagram for describing an antenna management system according to one embodiment of the present disclosure.

FIG. 1 is a conceptual diagram for describing an antenna management system according to one embodiment of the present disclosure.

An antenna management system 10 according to one embodiment of the present disclosure includes any one of a measuring device 100 and a direction control device 102.

The measuring device 100 is a device that measures spatial orientation information of an antenna device 104 by detecting an incident angle of sunlight. The measuring device 100 may be mounted on a housing of the antenna device 104 and generates video data obtained by capturing the foreground orientated by the antenna device 104. The measured spatial orientation information and captured video data will be described later with reference to FIG. 3.

The direction control device 102 is a device for controlling a tilting and steering means provided in the antenna device 104 so that the antenna device 104 has a target spatial orientation. In one embodiment, the tilting and steering means may be implemented by a mast supporting the antenna device 104 and a clamping device connecting the antenna device 104. For example, the direction control device 102 includes a data receiving unit (not shown) that receives the spatial orientation information of the antenna device 104 or video data obtained by capturing the foreground orientated by the antenna device 104 from the measuring device, and a control unit (not shown) that controls the tilting and steering means of the antenna device 104 so that the antenna device 104 has a preset target spatial orientation using at least one of the spatial orientation information and the video data. The direction control device 102 uses at least one of the spatial orientation information and video data measured by the measuring device 100 to measure an error between a current orientation direction of the antenna device 104 and the target spatial orientation. In one embodiment, the direction control device 102 may be implemented by a control circuit included in the antenna device 104. In another embodiment, the direction control device 102 may be implemented by part of a remote administrator (RAD) that manages the antenna device 104 installed in a plurality of sites. In another embodiment, the direction control device 102 may be implemented by a portable controller (RPC: RTS Portable Controller, hereinafter, referred to as "RPC") for RTS control carried by a base station operator. One embodiment of operations of the RAD and RPC will be described later with reference to FIGS. 4 and 6.

FIG. 2 is an exemplary diagram for describing hardware of the measuring device according to one embodiment of the present disclosure.

Figure 2A:
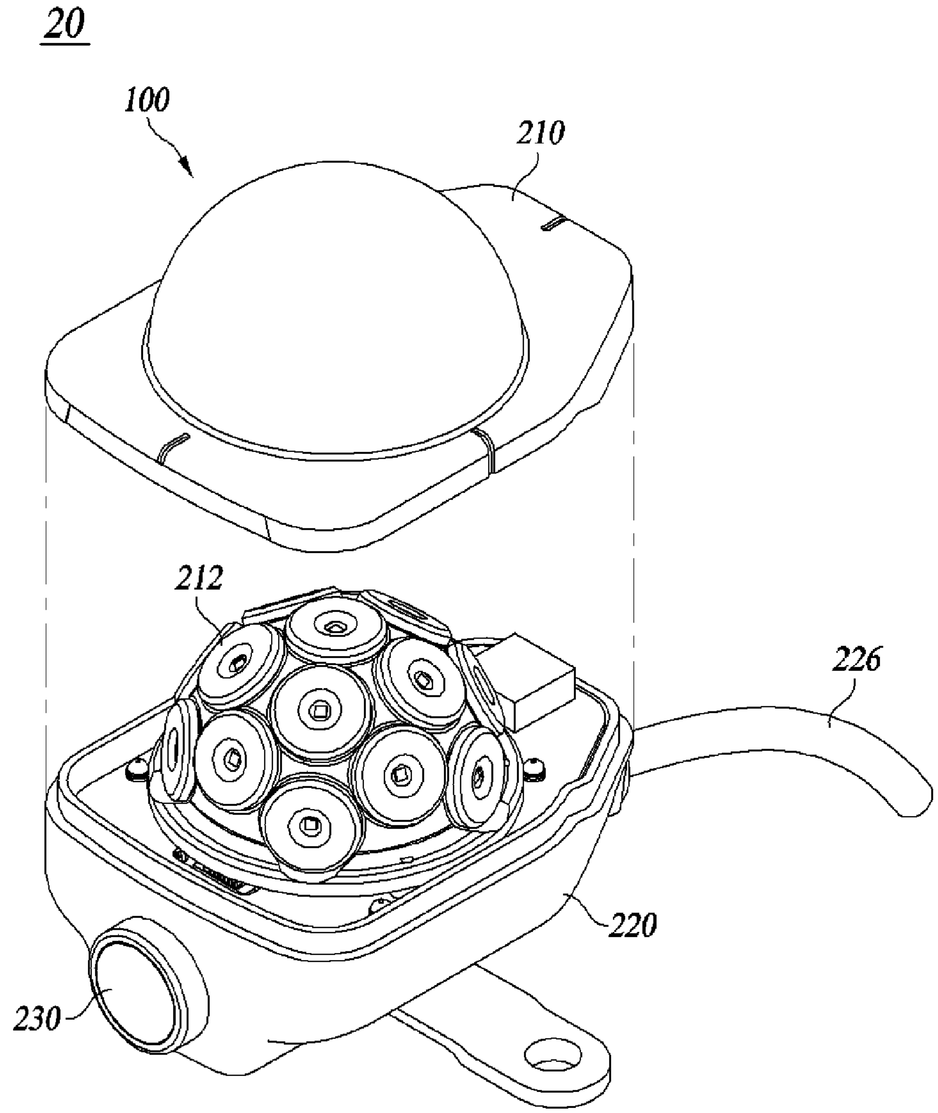
FIGS. 2A and 2B are exemplary diagrams for describing hardware of a measuring device according to one embodiment of the present disclosure.

Referring to FIG. 2A, an exploded perspective view 20 in which only some components of the measuring device 100 are separated is shown. The housing of the measuring device 100 includes a protection cap 210, a body 220, and a camera cover 230. FIG. 2A showing the protection cap 210, the body 220, and the camera cover is an exemplary drawing for describing the appearance of the measuring device 100, and the specific appearance of the measuring device 100 may be varied in various ways according to the embodiment of the present disclosure.

Figure 2B:
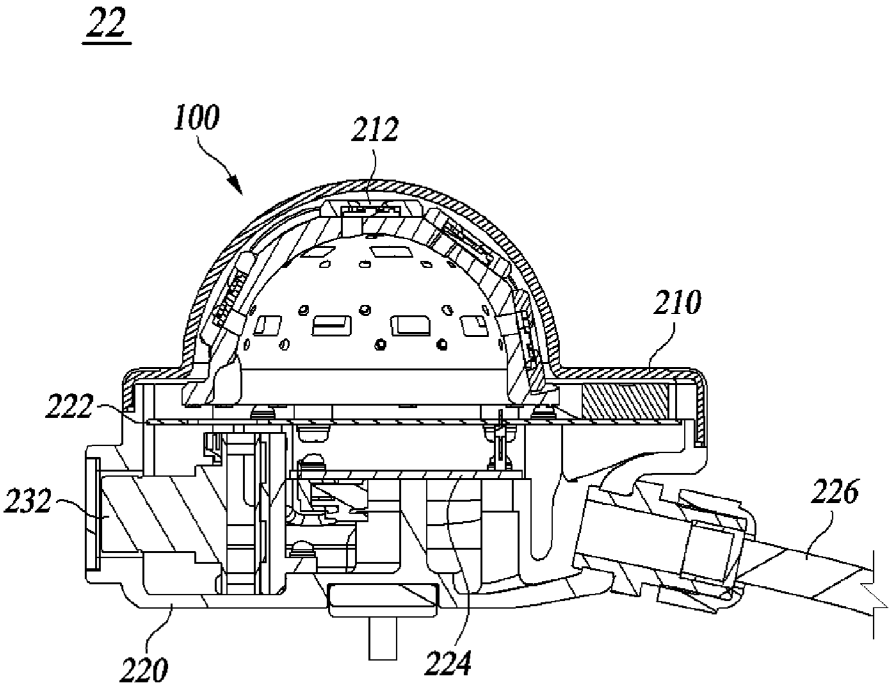

Referring to FIG. 2B, a cross-sectional side view 22 of the metering device 100 is shown. The inside of the measuring device 100 includes at least a photo sensor 212, a main board 222, a surge board 224, a control cable 226, and a camera module 232. In one embodiment, the measuring device 100 may further include a GPS module (not shown) that provides GPS information of the antenna device 104 corresponding to the installation location of the measuring device 100.

Referring to FIG. 2A, a plurality of photo sensors 212, which are arranged with different orientation directions from each other on the spherical surface of a structure having a half-sphere shape surrounded by the protection cap 210, measure the amount of light of sunlight. Each photo sensor 212 is disposed at intervals of a predetermined angle in a vertical direction in order to detect an incident angle of sunlight. Each photo sensor 212 is arranged at intervals of a predetermined angle in a horizontal direction in order to determine the orientation of the antenna device 104. As shown in FIG. 2A, since the plurality of photo sensors 212 are disposed on the spherical surface of the hemispherical structure, the measuring device 100 can measure the 3D spatial orientation information having azimuth, tilt, and roll as elements.

The main board 222 processes data collected by each module included in the measuring device 100 and controls each module. The surge board 224 prevents malfunctions and defects of the measuring device 100 due to overvoltage. The camera module 232 captures the foreground orientated by the antenna device 104 in which the measuring device 100 is installed. The GPS module can measure the latitude and longitude of the current location where the beam navigator is installed.

Figure 3:
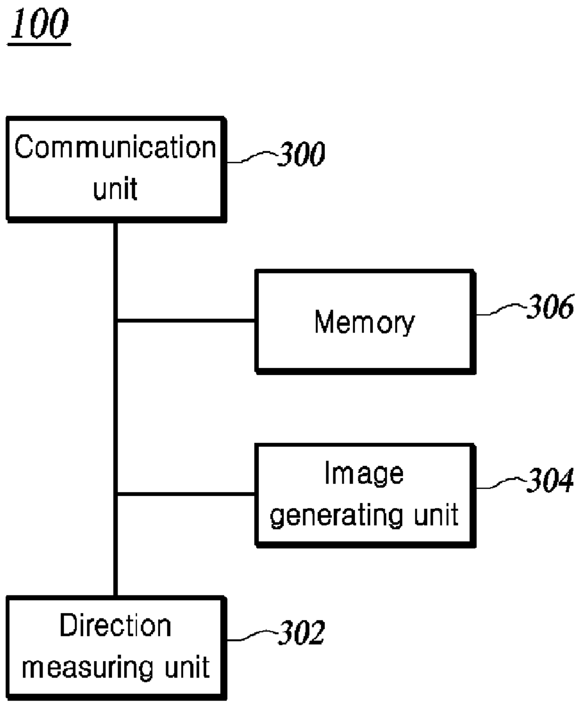
FIG. 3 is a block configuration diagram for describing the measuring device according to one embodiment of the present disclosure.

FIG. 3 is a block configuration diagram for describing the measuring device according to one embodiment of the present disclosure.

The measuring device 100 according to one embodiment of the present disclosure includes all or some of a communication unit 300, a direction measuring unit 302, an image generating unit 304, and a memory 306. The measuring device 20 shown in FIG. 3 is according to one embodiment of the present disclosure, and all blocks shown in FIG. 3 are not essential components, and some blocks included in the measuring device 100 in another embodiment may be added, changed, or deleted. The direction measuring unit 302 and the image generating unit 304 may be logical components implemented by a processor included in the main board 222.

Hereinafter, each component included in the measuring device 100 will be described with reference to FIG. 3.

The communication unit 300 provides access to an external network. For example, a remote administrator 400 may transmit or receive data to or from the direction control device 102 or the antenna device 104 through the communication unit 300. In one embodiment, the control cable 226 may operate as a part of communication unit 300. The measuring device 100 transmits and receives measurement data and control data to or from an external device through the control cable 226.

The direction measuring unit 302 calculates the incident angle of sunlight based on output information measured by the plurality of photo sensors 212. The direction measuring unit 302 calculates the azimuth of the antenna device 104 based on the calculated incident angle of sunlight, single GPS information collected by the GPS module, and a date and time of measuring the amount of sunlight. Here, the azimuth calculated by the direction measuring unit 302 may be an absolute azimuth or absolute horizontal azimuth. Here, the single GPS information includes the latitude and longitude of the location where the measuring device 100 is installed. The direction measuring unit 302 may measure the tilt and roll of the antenna device 104 in real time using an Inertial Measurement Unit sensor (IMU sensor). Meanwhile, a method for measuring the azimuth, tilt, and roll using the GPS device and sensor is disclosed in Korean Patent Publication No. 2018-0023198 or the like.

The direction measuring unit 302 tracks a change in position of the antenna device 104 by using a motion sensor to measure the azimuth of the antenna device 104 in a meteorological environment in which sunlight cannot be detected. For example, the motion sensor may be a displacement sensor that detects the amount of change in position, but the specific type of motion sensor is not limited. The direction measuring unit 302 may output the 3D spatial orientation information having calculated and measured azimuth, tilt, and roll as respective elements. In one embodiment, the direction measuring unit 302 may be implemented by a photo sensor module including a plurality of photo sensors 212 and part of the main board 222.

Exemplary measurement data output by the direction measuring unit 302 is shown in Table 1. Here, the measurement data includes the latitude and longitude. In Table 1, a tolerance means a difference between the latitude and longitude provided by Google Map and the measurement data by the direction measuring unit 302.

TABLE 1

| Item | | Measure | | | | | |
|---|---|---|---|---|---|---|---|
| | | 1st | 2nd | 3rd | 4th | 5th | AVG. |
| GPS Detect Time [sec] | | 42 | 47 | 53 | 45 | 55 | 48.4 |
| Latitude | Google Map | 33.86 | 33.86 | 33.86 | 33.86 | 33.86 | 33.86 |
| | Beam Navigation | 33.51 | 33.51 | 33.51 | 33.51 | 33.51 | 33.51 |
| | Tolerance | 0.35 | 0.35 | 0.35 | 0.35 | 0.35 | 0.35 |
| Longitude | Google Map | −117.89 | −117.89 | −117.89 | −117.89 | −117.89 | −117.89 |
| | Beam Navigation | −117.53 | −117.53 | −117.53 | −117.53 | −117.53 | −117.53 |
| | Tolerance | −0.36 | −0.36 | −0.36 | −0.36 | −0.36 | −0.36 |
| Altitude | | 56.1 | 59.3 | 45.7 | 39.3 | 54 | 50.88 |

Table 2 shows exemplary azimuth data measured by the direction measuring unit 302 in an actual mobile communication base station field. In Table 2, an error represents a difference between the azimuth provided by Google Maps and the azimuth measured by the direction measuring unit 302.

TABLE 2

| | Google map | BN | Error | UE Application (for reference) |
|---|---|---|---|---|
| Azimuth | 180° | 177.8° | 2.2° | 157° |

The image generating unit 304 generates the image or video data obtained by capturing the foreground orientated by the antenna device 104 in which the measuring device 100 is installed. The direction control device 102 monitors a change in the orientation direction of the antenna device 104 using video data generated by the image generating unit 304. The image generating unit 304 may be implemented by the camera module 232 and part of the main board 222.

The memory 306 may store a program that causes a processor to perform a method of controlling the orientation direction of the mobile communication base station antenna according to one embodiment of the present disclosure. For example, the program may include a plurality of instructions executable by the processor, and a positioning database update method may be performed by executing the plurality of instructions by the processor. The memory 306 may include at least one of volatile memory and non-volatile memory. The volatile memory includes static random access memory (SRAM) or dynamic random access memory (DRAM), and the like, and the non-volatile memory includes flash memory and the like.

Figure 4:
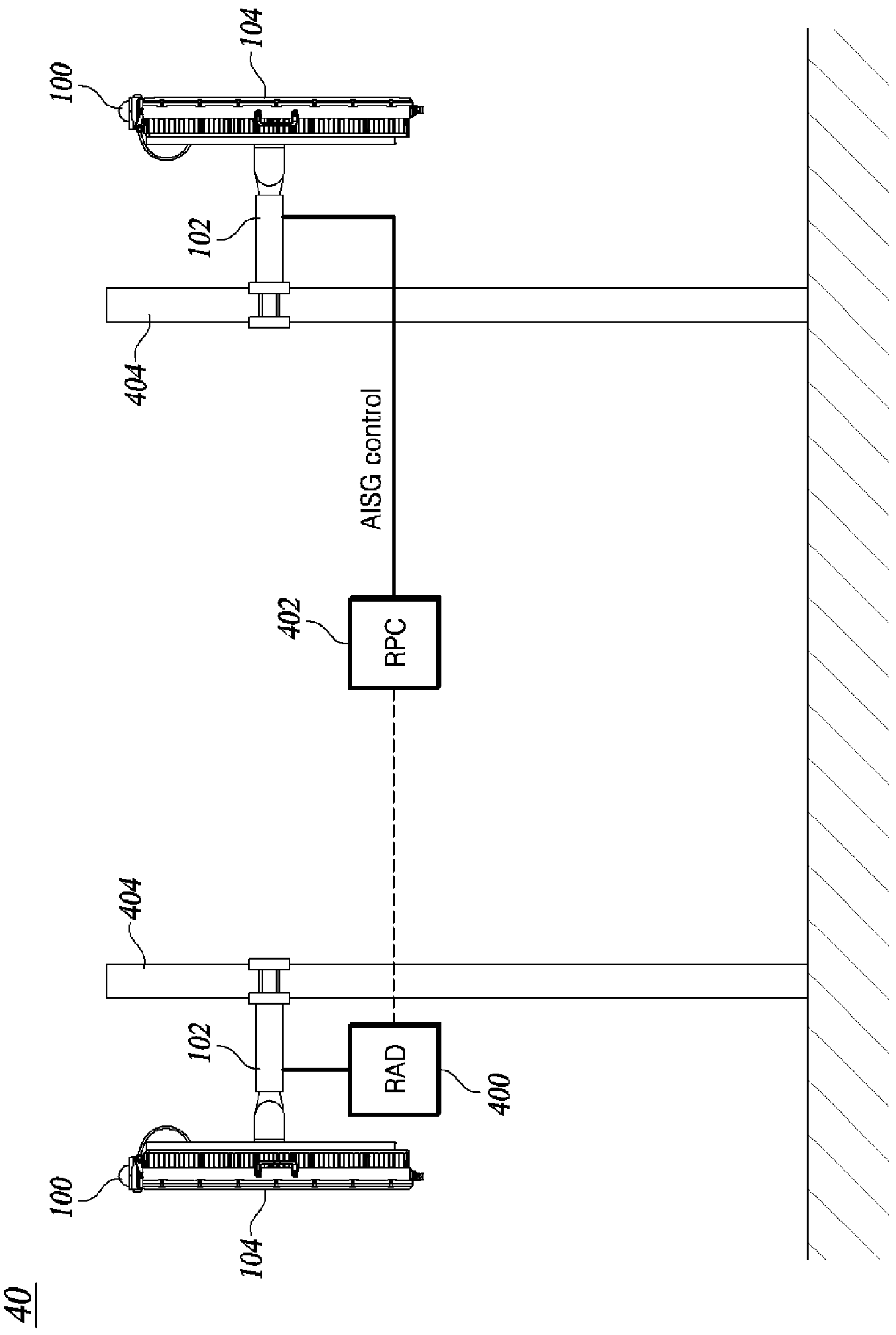
FIG. 4 is an exemplary diagram for describing one embodiment in which a direction control device controls an antenna based on communication with an RPC according to one embodiment of the present disclosure.

FIG. 4 is an exemplary diagram for describing one embodiment in which the direction control device controls the antenna based on communication with the RPC according to one embodiment of the present disclosure.

Referring to an exemplary view 40 of FIG. 4, an antenna 104 and an RPC 402 controlling at least one antenna 104 respectively disposed in a remote base station are shown. In one embodiment, antenna 104 is supported by a mast 404, and the direction control device 102 may be disposed between the antenna 104 and the mast 404. In another embodiment, the direction control device 102 may be implemented as part of an antenna to control a clamping device supporting the antenna 104.

The measuring device 100 measures the 3D spatial orientation information of the antenna device 104 measured in real time. The direction control device 102 controls a remote tilting and steering means (hereinafter, "RTS module") provided in the antenna device 104 based on the spatial orientation information. Specifically, the direction control device 102 remotely monitors the tilt and steering of the antenna device 104 and aligns the antenna device 104 so that the antenna device 140 has the target spatial orientation. A clamping device for an antenna and a control method thereof to change the angle of the antenna device 104 are known in the art, and thus, a detailed description thereof will be omitted.

Referring to FIG. 4, the RPC 402 receives current spatial orientation information of the plurality of antenna devices 104 measured by the measuring device 100. In the embodiment of FIG. 4, the direction control device 102 for controlling the tilting angle and orientation angle of the antenna device 104 may be implemented by the RAD 400 or the RPC 402. In one embodiment, the RPC 402 may transmit or receive data with the measuring device 100 using wired or wireless communication. In another embodiment, the RPC 402 may be connected wirelessly or in a wired manner with an RTS module for providing the RTS function. For example, the RPC 402 may perform wired communication using a local area network (LAN) or a wide area network (WAN). RPC 402 may perform wireless communication through a cellular network or a Wi-Fi network. However, the specific type of wireless or wired communication network used by the RPC 402 is not limited thereto. The base station operator may use the RPC 402 at the installation or maintenance site of the antenna device 104 to check the received spatial orientation information, and thus, check whether the current orientation direction of each antenna device 104 matches the originally designed target spatial orientation. In another embodiment, the RPC 402 may generate control data for each antenna device 104 to have a target spatial orientation based on the current spatial orientation information of the plurality of antenna devices 104. The RPC 402 may control the tilting angle and orientation angle of the antenna device 104 by transmitting control data to the RTS module of the antenna device 104. The RPC 402, the measuring device 100, and the RTS module may transmit or receive measurement data and control data to each other according to an Antenna Interface Standards Group protocol (AISG protocol). The AISG protocol is a standardized specification to secure interconnectivity for the antenna control method, and since it is already known in the art, a detailed description thereof will be omitted.

FIG. 5 is an exemplary view for describing one embodiment of monitoring the antenna device using the video data generated by the measuring device according to one embodiment of the present disclosure.

Figure 5A:
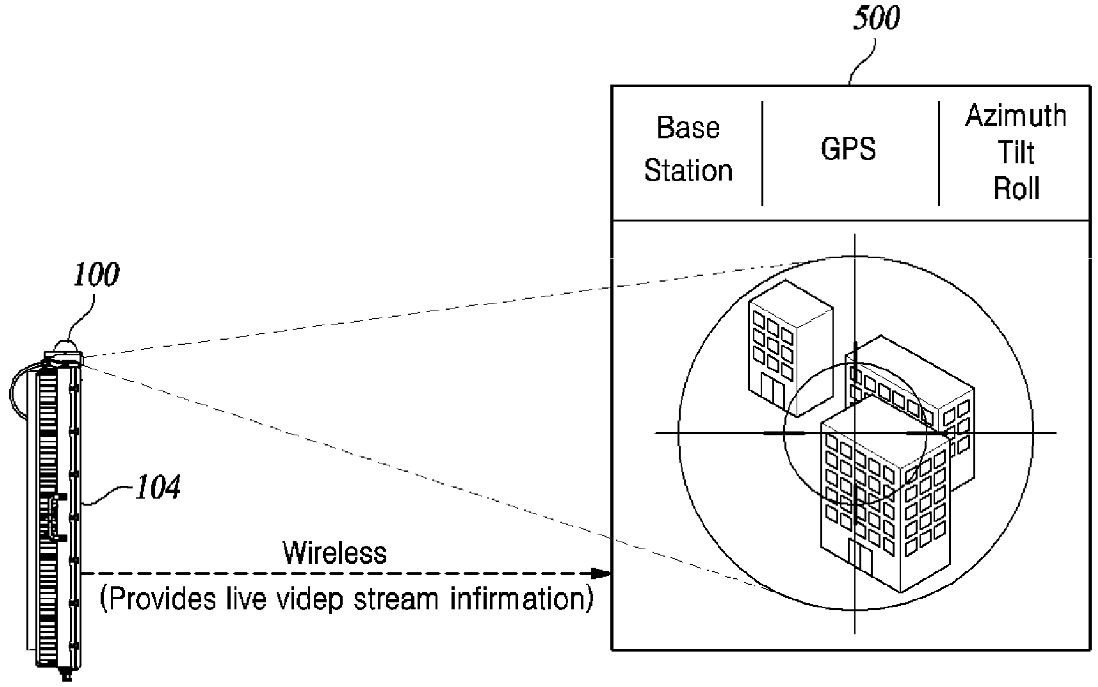
FIGS. 5A and 5B are exemplary views for describing one embodiment of monitoring an antenna device using video data generated by a measuring device according to one embodiment of the present disclosure.

Referring to FIG. 5A, the remote administrator 400 disposed in a central control center receives, through the AISG protocol", the spatial orientation information and the video data generated by the measuring device 100 from the antenna devices 104 installed in a plurality of places. A manager of the central control center can monitor the foreground orientated by the antenna device 104 located in each base station using video data provided through a display 500. In addition, the manager can monitor the GPS coordinates and spatial orientation coordinates of each antenna device 104.

Figure 5B:
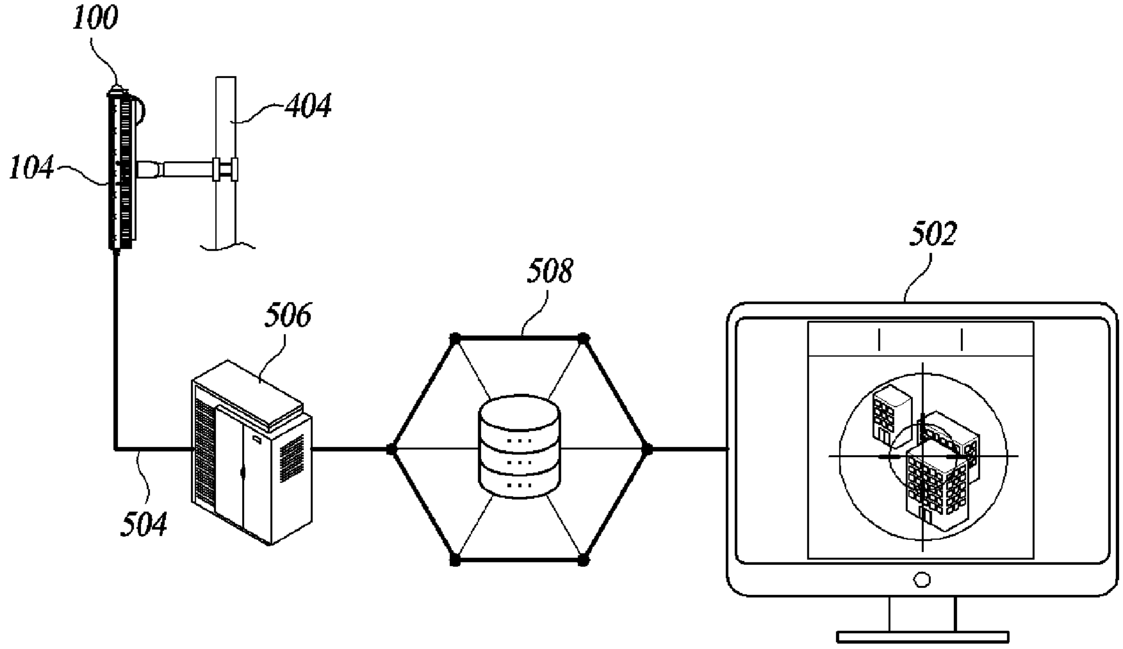

Referring to FIG. 5B, an operation & management center 502 receives information generated by the measuring device 100 disposed on the antenna device 104 installed in a plurality of sites. The information generated by the measuring device 100 includes the azimuth, the tilt, the roll, the video data obtained by capturing the foreground to which the antenna device 104 is directed, and the GPS information. The GPS information includes the latitude, longitude, and altitude of the antenna device 104. Specifically, the information generated by the measuring device 100 is transmitted to a core network 508 through an AISG protocol via an optical fiber 504 and a digital unit (DU) 506. The operation & management center 502 connected to the core network 508 is a communication network management system and can monitor the change in the orientation direction of the antenna device 104 in real time.

Figure 6:
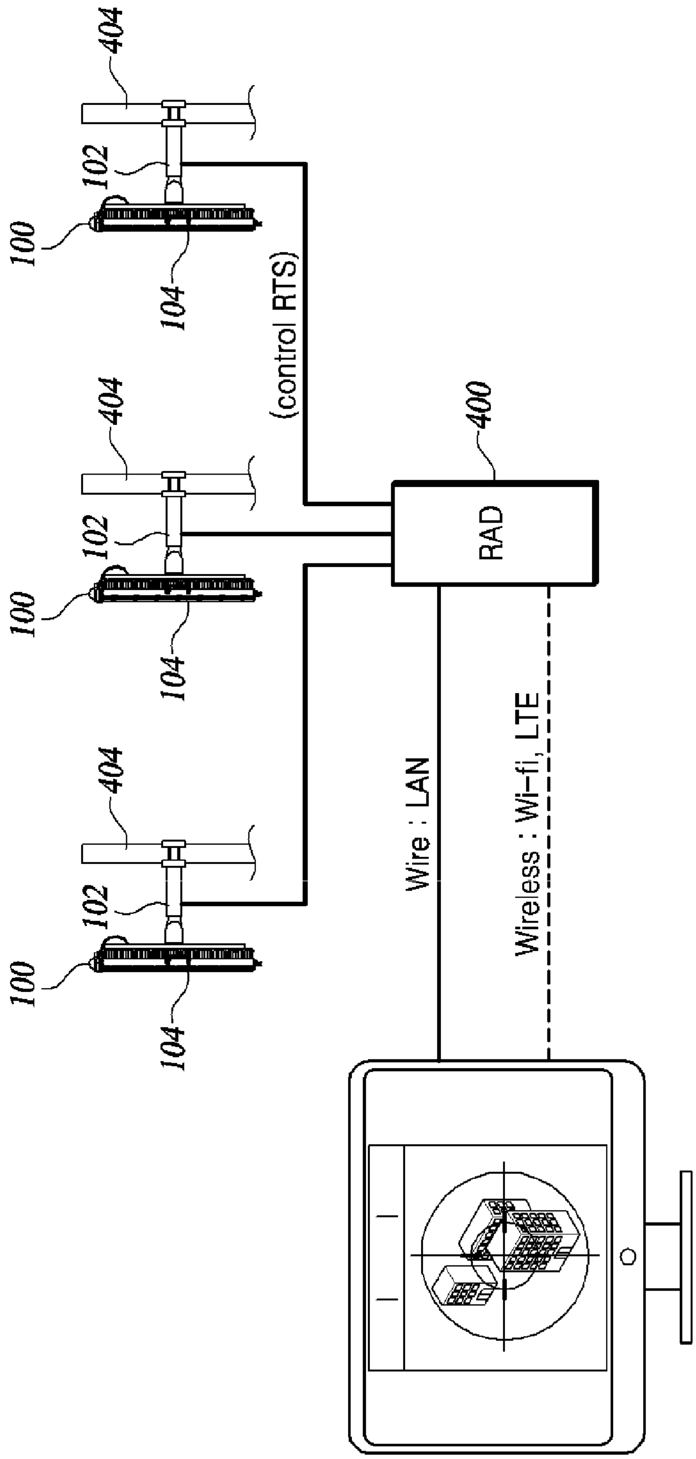
FIG. 6 is an exemplary diagram for describing one embodiment in which the measuring device transmits the video data to a remote administrator according to one embodiment of the present disclosure.

FIG. 6 is an exemplary diagram for describing one embodiment in which the measuring device transmits the video data to the remote administrator according to one embodiment of the present disclosure.

Referring to FIG. 6, the remote administrator 400 receives the current spatial orientation information of the antenna device 104 using wired or wireless communication. In the embodiment of FIG. 6, the direction control device 102 for controlling the tilting angle and orientation angle of the antenna device 104 may be implemented by the remote administrator 400. The remote administrator 400 may control the RTS module of the antenna device 104 based on the difference between the current spatial orientation information and the target spatial orientation information. That is, the remote administrator 400 may detect a change in the orientation direction of the antenna device 104 due to an external environment in real time and automatically control the RTS module so that the antenna device 104 has the target orientation direction.

In another embodiment, the remote administrator 400 may monitor and control the change in orientation direction of the antenna device 104 without the spatial orientation information of the antenna device 104. For example, an exceptional situation in which the measuring device 100 cannot measure spatial orientation information of the antenna device 104 may be assumed. The exceptional situation may be a situation in which sunlight is not incident at night, bad weather in which the amount of sunlight is insignificant, or a case where a failure of the photo sensor 212 occurs. The remote administrator 400 uses the video data, which is generated by the measuring device 100, in an auxiliary way when orientation direction monitoring based on the spatial orientation information of the antenna device 104 is impossible. The remote administrator 400 may monitor the change in the orientation direction of the antenna device 104 based on the video data, and control the tilting angle and orientation angle of the antenna device 104. For example, the remote administrator 400 may store an image frame of video data captured in a situation in which the spatial orientation information of the antenna device 104 measured by the measuring device 100 coincides with target spatial orientation information as a reference image. Subsequently, when measurement of the spatial orientation information by the measuring device 100 is impossible, the remote administrator 400 compares the image frame obtained from the video stream obtained by capturing the foreground to which the antenna device 104 is directed with the reference image. Specifically, the remote administrator 400 detects the change in the orientation direction by controlling the RTS module of the antenna device 104 so that the center of an image frame received in real time coincides with the center of the reference image.

In another embodiment of the present disclosure, the remote administrator 400 may remotely adjust the tilting angle and orientation angle of the antenna device 104 in response to changes in the wireless environment on the path through which radio waves are transmitted from the base station antenna device 104. Here, the change in the wireless environment means a change in the wireless communication environment due to new building construction, land development, or terrain change.

In another embodiment of the present disclosure, the remote administrator 400 may provide the spatial orientation information measured by the measuring device 100 to a base-band unit (BBU). Spatial orientation information, which is accurate information about the actual antenna beam direction, can be used in a solution for network optimization. A mobile communication service provider checks the antenna beam direction through the spatial orientation information measured by the measuring device 100 according to the present disclosure. The mobile communication service provider can build a more precise network optimization solution by remotely aligning the desired antenna beam direction using the RTS module.

In another embodiment, the direction control device 102 may be implemented by a control circuit of antenna device 104. The control circuit receives the current spatial orientation information of the antenna device 104 from the measuring device 100. An algorithm for automatically controlling the RTS module of the antenna device 104 based on the difference between the current spatial orientation information and the target spatial orientation information may be mounted in the control circuit. That is, the control circuit of the antenna device 104 may detect the change in the orientation direction of the antenna device 104 due to external factors in real time and provide a function of automatically restoring the antenna device 104 to have the target orientation direction.

Figure 7:
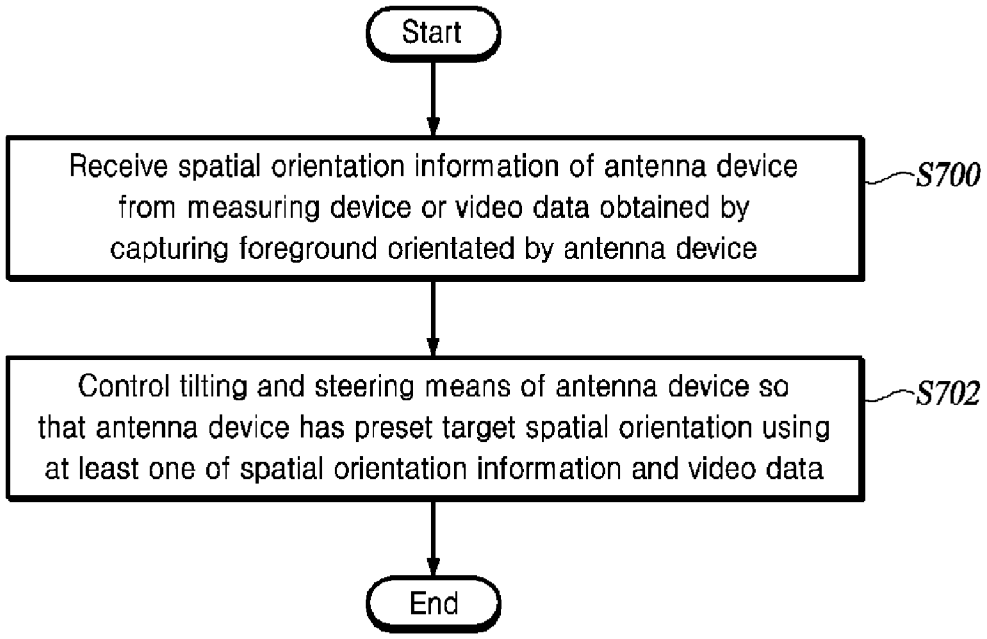
FIG. 7 is a flow chart for describing each process included in an antenna management method performed by a direction control device according to one embodiment of the present disclosure.

FIG. 7 is a flow chart for describing each process included in the antenna management method performed by the direction control device according to one embodiment of the present disclosure.

Hereinafter, each process included in the antenna management method will be described with reference to FIG. 7. Meanwhile, descriptions overlapping those of FIGS. 1 to 6 will be omitted.

The data receiving unit included in the direction control device 102 receives the spatial orientation information of the antenna device 104 from the measuring device 100 or the video data obtained by capturing the foreground orientated by the antenna device 104 (S700).

The control unit included in the direction control device 102 controls the tilting and steering means of the antenna device 104 so that the antenna device 104 has the preset target spatial orientation using at least one of the spatial orientation information and the video data (S702).

In the flow chart, each process is described as sequentially executed, but this is merely an example of the technical idea of some embodiments of the present disclosure. In other words, those skilled in the art to which some embodiments of the present disclosure belong may change and execute the processes described in the flow chart within the scope of not departing from the essential characteristics of some embodiments of this disclosure, or can apply various modifications and variations by executing one or more processes in parallel. Therefore, the flow chart is not limited to a time-series order.

Various implementations of the devices and methods described herein may include a digital electronic circuit, an integrated circuit, a field programmable gate arrays (FPGA), an application specific integrated circuit (ASIC), computer hardware, firmware, software, and/or combinations thereof. These various implementations may include being implemented by one or more computer programs executable on a programmable system. The programmable system includes at least one programmable processor (which may be a special purpose processor or may be a general-purpose processor) coupled to receive data and instructions from and transmit data and instructions to the storage system, at least one input device, and at least one output device. Computer programs (also known as programs, software, software applications, or code) contain instructions for a programmable processor and are stored on a "computer readable medium".

The computer-readable recording medium includes all types of recording devices in which data that can be read by a computer system is stored. The computer-readable recording medium may further include non-volatile or non-transitory media such as a ROM, a CD-ROM, a magnetic tape, a floppy disk, a memory card, a hard disk, a magneto-optical disk, and a storage device or a transitory medium such as a data transmission medium. In addition, the computer-readable recording medium may be distributed in computer systems connected through a network, and computer-readable codes may be stored and executed in a distributed manner.

Various implementations of the devices and methods described herein may be implemented by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, and a mobile device.

The invention claimed is:

1. An antenna management system including a direction control device for controlling the orientation direction of a mobile communication base station antenna, wherein the direction control device comprises:

a data receiver configured to receive spatial orientation information of an antenna device or video data obtained by capturing a foreground orientated by the antenna device from a measuring device; and a controller configured to control a tilting and steering driver of the antenna device so that the antenna device has a preset target spatial orientation using at least one of the spatial orientation information and the video data, wherein the controller is configured to:

monitor a change in the orientation direction of the antenna device by using the video data as an aid when measurement of the spatial orientation information is impossible, and in response to detecting the change in the orientation direction, control the tilting and steering driver so that the antenna device has the target spatial orientation, wherein the controller is further configured to:

store an image frame of the video data in advance as a reference image in a situation in which the spatial orientation information of the antenna device coincides with preset target spatial orientation information, and monitor the change in the orientation direction of the antenna device by comparing an image frame obtained from video data generated in real time by the measuring device with the reference image.

2. The antenna management system of claim 1, wherein the controller:

monitors a change in the orientation direction of the antenna device in real time based on a difference between the spatial orientation information and the preset target spatial orientation information, and in response to detecting the change in the orientation direction, controls the tilting and steering driver so that the antenna device has the target spatial orientation.

3. The antenna management system of claim 1, wherein the direction control device is any one of a remote administrator which manages antenna devices installed in a plurality of places, a portable controller for RTS control carried by a base station operator, and a control circuit mounted on the antenna device.

4. An antenna management method performed by a direction control device for controlling an orientation direction of a mobile communication base station antenna on an antenna management system including the direction control device, the antenna management method comprising:

receiving spatial orientation information of an antenna device or video data obtained by capturing a foreground orientated by the antenna device from a measuring device; and controlling a tilting and steering driver of the antenna device so that the antenna device has a preset target spatial orientation using at least one of the spatial orientation information and the video data, wherein the controlling includes:

monitoring a change in the orientation direction of the antenna device by using the video data as an aid when measurement of the spatial orientation information is impossible, and in response to detecting the change in the orientation direction, controlling the tilting and steering driver so that the antenna device has the target spatial orientation, wherein the controlling further includes:

storing an image frame of the video data in advance as a reference image in a situation in which the spatial orientation information of the antenna device coincides with preset target spatial orientation information, and monitoring the change in the orientation direction of the antenna device by comparing an image frame obtained from video data generated in real time by the measuring device with the reference image.

5. The antenna management method of claim 4, wherein the controlling includes monitoring a change in the orientation direction of the antenna device in real time based on a difference between the spatial orientation information and the preset target spatial orientation information, and in response to detecting the change in the orientation direction, controlling the tilting and steering driver so that the antenna device has the target spatial orientation.

* * * * *